(12) United States Patent
Cedergren et al.

(10) Patent No.: US 11,159,287 B2
(45) Date of Patent: Oct. 26, 2021

(54) DETERMINATION OF REFERENCE SIGNAL TRANSMISSION PATTERN (71) Applicant: Telefonaktiebolaget LM Ericsson (publ), Stockholm (SE)

(72) Inventors: Andreas Cedergren, Bjarred (SE); Andres Reial, Malmo (SE); Claes Tidestav, Balsta (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/567,920

(22) PCT Filed: Oct. 20, 2015

(86) PCT No.: PCT/EP2015/074260
§ 371 (c)(1),
(2) Date: Oct. 19, 2017

(87) PCT Pub. No.: WO2017/067580
PCT Pub. Date: Apr. 27, 2017

(65) Prior Publication Data
US 2018/0115401 A1  Apr. 26, 2018

(51) Int. Cl.
H04L 5/00 (2006.01)
H04W 4/02 (2018.01)
H04W 72/04 (2009.01)

(52) U.S. Cl.
CPC .......... *H04L 5/0048* (2013.01); *H04W 4/026* (2013.01); *H04W 4/027* (2013.01); *H04W 72/0486* (2013.01)

(58) Field of Classification Search
None
See application file for complete search history.

(56) References Cited

U.S. PATENT DOCUMENTS 9,537,547 B1 * 1/2017 Kazeminejad ....... H04B 7/0421
10,382,242 B2 * 8/2019 Zheng ................... H04L 27/261
(Continued)

FOREIGN PATENT DOCUMENTS

EP  1954091 A2  8/2008
EP  2725833 A1  4/2014
WO  2011139201 A1  11/2011

OTHER PUBLICATIONS

PCT International Search Report, dated Jun. 20, 2016, in connection with International Application No. PCT/EP2015/074260, all pages.
(Continued)

*Primary Examiner* — Christopher T Wyllie
(74) *Attorney, Agent, or Firm* — Leffler Intellectual Property Law, PLLC (57) ABSTRACT

A method for a network node of a cellular communication network is disclosed. The network node is adapted to communicate with a wireless communication device. The method comprises acquiring location-related parameters of the wireless communication device, dynamically determining—based on the acquired location-related parameters—a transmission pattern of reference signals (wherein the reference signals are for mobility measurements by the wireless communication device), indicating the determined transmission pattern to the wireless communication device and transmitting the reference signals in accordance with the determined transmission pattern. Dynamically determining the transmission pattern may be further based on handover statistics associated with the location-related parameters. The location-related parameters may comprise at least one of a geographical position of the wireless communication device and a travelling speed of the wireless communication device. The location-related parameters may further comprise a travelling direction of the wireless communication (Continued)

device. Corresponding arrangement, network node and computer program product are also disclosed.

30 Claims, 2 Drawing Sheets

(56) References Cited

U.S. PATENT DOCUMENTS

| | | | | |
|---|---|---|---|---|
| 2005/0136845 A1* | 6/2005 | Masuoka | ............... | G01S 1/042 455/67.14 |
| 2010/0080269 A1* | 4/2010 | Kim | ............... | H04L 5/0035 375/211 |
| 2010/0172311 A1* | 7/2010 | Agrawal | ............... | H04L 5/0082 370/329 |
| 2010/0271965 A1* | 10/2010 | Siomina | ............... | H04W 72/042 370/252 |
| 2010/0310005 A1* | 12/2010 | Takagi | ............... | H04B 7/061 375/295 |
| 2012/0040696 A1* | 2/2012 | Siomina | ............... | H04L 5/0062 455/456.6 |
| 2012/0188976 A1* | 7/2012 | Kim | ............... | H04W 72/1289 370/329 |
| 2012/0231809 A1* | 9/2012 | Siomina | ............... | H04W 64/00 455/456.1 |
| 2013/0059619 A1* | 3/2013 | Kim | ............... | H04L 5/0051 455/509 |
| 2014/0219237 A1* | 8/2014 | Charbit | ............... | H04L 5/005 370/330 |
| 2014/0247743 A1* | 9/2014 | Seo | ............... | H04W 24/10 370/252 |
| 2014/0328307 A1* | 11/2014 | Takano | ............... | H04W 48/18 370/329 |
| 2014/0362717 A1* | 12/2014 | Koskinen | ............... | H04W 24/02 370/252 |
| 2015/0098387 A1* | 4/2015 | Garg | ............... | H04W 4/023 370/328 |
| 2015/0304929 A1* | 10/2015 | Hua | ............... | H04W 36/32 455/436 |
| 2015/0312010 A1* | 10/2015 | Urabayashi | ............... | H04L 1/0693 370/329 |
| 2016/0146930 A1* | 5/2016 | Rached | ............... | G01S 11/06 370/252 |
| 2016/0205677 A1* | 7/2016 | Kim | ............... | H04L 5/0048 370/329 |
| 2016/0241308 A1* | 8/2016 | Kim | ............... | H04L 5/005 |
| 2017/0005848 A1* | 1/2017 | Zheng | ............... | H04W 56/001 |
| 2017/0264412 A1* | 9/2017 | Chen | ............... | H04L 5/0048 |
| 2019/0007923 A1* | 1/2019 | Blankenship | ............... | H04W 24/10 |

OTHER PUBLICATIONS

PCT Written Opinion, dated Jun. 20, 2016, in connection with International Application No. PCT/EP2015/074260, all pages.

3GPP TR 37.857, V0.5.0 (Aug. 2015), 3rd Generation Partnership Project; Technical Specification Group Radio Access Network; Study on Indoor Positioning Enhancements for UTRA and LTE (Release 13), 82 pages.

Indian Office Action dated Mar. 20, 2020 in connection with India Application No. 201837010443, 6 pages.

* cited by examiner

DETERMINATION OF REFERENCE SIGNAL TRANSMISSION PATTERN

TECHNICAL FIELD

The present invention relates generally to the field of wireless communication. More particularly, it relates to the determination of transmission patterns for reference signal transmission in wireless communication systems.

BACKGROUND

Handover functionality is a vital part of cellular communication network providing mobility. A (node) handover is the process of transferring an ongoing connection of a wireless communication device (e.g. user equipment—UE) from one network node (the serving) to another network node (the target) in order to provide mobility and accomplish a transparent service over a larger area. The handover should ideally take place without any loss of data and with as short communication interruption as possible.

To enable a handover, it is necessary to find a suitable target network node, and to ensure that it is possible for the wireless communication device to sustain reliable communication with that target network node. Candidates for a suitable target network node are usually kept in so-called neighbor lists, which are stored at least at the serving network node. To ensure that it is possible to sustain reliable communication with a candidate network node, the connection quality (e.g. in terms of received signal power, signal-to-interference ratio, or similar) of the candidate network node needs to be estimated before the handover is performed.

The connection quality of the candidate network nodes is typically estimated by downlink and/or uplink mobility measurements. The uplink connection quality can be different from the downlink connection quality. Therefore, handovers of downlink transmissions in cellular communication networks are typically based on downlink mobility measurements.

In many cellular communication networks, all nodes continuously transmit reference (pilot) signals, with known information, which wireless communication devices in the vicinity may use to perform mobility measurements for estimation of the connection quality of the corresponding network nodes.

Some cellular communication networks may use advanced antenna systems to enable transmission of signals in (narrow) beams to increase signal strength in some directions (e.g. towards a wireless communication device) and/or to reduce interference in other directions. In such networks, handover will not only occur between network nodes, but also between beams (provided by the same or different network nodes), i.e. from a serving beam to a target beam.

Continuously transmitting reference signals in all beams to enable mobility measurements is highly inefficient (at least when there are a large number of beams per network node) in terms of power consumption and impact on interference. Instead, the network node may turn on reference signal transmission in an appropriate set of candidate beams when the need for a beam handover (also termed beam switch) arises.

For example, the serving network node may detect when the quality of the downlink serving beam starts to deteriorate by considering channel quality reports received from the wireless communication device. When the quality fulfills some criteria (e.g. a quality metric falling below a threshold) the serving network node may trigger a downlink mobility session including activation of reference signal transmission for a set of candidate beams and requesting the wireless communication device to perform mobility measurements. The reference signal transmission will be exemplified herein by transmission of downlink mobility reference signals (DL-MRS).

The time gap during which a beam handover needs to be completed may, for example, start when the quality of the serving beam (possibly averaged over some window of time) fulfills some criterion in relation to (typically becomes weaker than) the quality of a candidate—or another active— beam (possibly averaged over some window of time). Alternatively, the time gap during which a beam handover needs to be completed may start when the quality of the serving beam (possibly averaged over some window of time) fulfills some predetermined performance criterion. A predetermined performance criterion may, for example, be that the quality of the serving beam (possibly averaged over some window of time) falls below a quality threshold and/or that the quality of the serving beam (possibly averaged over some window of time) is worse than a tabulated expected quality for the current location of the wireless communication device. The time gap during which a beam handover needs to be completed may, for example, end when the quality of the serving beam is too low to enable proper processing, i.e. when the serving beam is lost. The time gap during which a beam handover needs to be completed may vary depending on the scenario. Numerous variations to the previous examples of definition of the time gap during which a beam handover needs to be completed may be envisioned.

The network typically configures the reference signal transmission pattern according to some criteria that lead to good average performance for the network. The time it takes to complete a beam handover depends on the reference signal transmission pattern. For example, if the reference signals are transmitted often a beam switch may be completed faster than if the reference signals are transmitted more scarcely.

Typically, frequent transmission of reference signals leads to good handover performance but also to high usage of radio resources, while infrequent transmission of reference signals leads to low usage of radio resources but also to poor handover performance (at least in some scenarios).

Therefore, there is a need for an improved approach to determination of reference signal transmission patterns for mobility measurements.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that the term mobility measurements when used herein is meant to comprise handover measurements. Generally, the mobility measurements referred to herein may be applicable as a basis for making any suitable mobility decision including, but not limited to, decisions regarding handover between nodes and inter-node beam switch.

It is an object of some embodiments to solve or mitigate at least some of the above or other disadvantages.

According to a first aspect, this is achieved by a method for a network node of a cellular communication network, wherein the network node is adapted to communicate with a wireless communication device.

The method comprises acquiring location-related parameters of the wireless communication device and dynamically determining (based on the acquired location-related parameters) a transmission pattern of reference signals, wherein the reference signals are for mobility measurements by the wireless communication device.

The method also comprises indicating the determined transmission pattern to the wireless communication device and transmitting the reference signals in accordance with the determined transmission pattern.

Indicating the determined transmission pattern to the wireless communication device may, in some embodiments, comprise transmitting an indication of the determined transmission pattern to the wireless communication device.

According to some embodiments, dynamically determining the transmission pattern may be further based on handover statistics associated with the location-related parameters.

The handover statistics may, for example, comprise statistics of distances and/or times in which a handover needs to be performed (e.g. to avoid loss of the communication link). A time may, for example, be a duration of time or a time window. The handover statistics may be dependent on one or more of the location-related parameters The location-related parameters may, for example, describe mobility. The location-related parameters may e.g. comprise one or more of a starting point, a travelling direction, and a travelling speed (i.e. a magnitude of velocity) of the wireless communication device. The starting point may be a geographical position or any other suitable parameter, such as a serving beam identity.

The term geographical position when used herein is meant to be interpreted as one or more of an actual geographical position (or an approximation thereof), a received signal strength signature, and an identity of the serving beam. A signal strength signature may, for example, comprise a set of signal strength measurements from more than one transmission points (e.g. network nodes) in the network. Thus, a signal strength signature may be associated with a triangulation approach (not necessarily relating to physical location coordinates, but rather to coordinates of a signal strength space).

The term geographical position may additionally include signal characteristics experienced by the wireless communication device, such as a beam signal quality, a signal strength fingerprint, etc.

According to some embodiments, the location-related parameters may comprise at least one of a geographical position of the wireless communication device and a travelling speed of the wireless communication device.

The location-related parameters may further comprise a travelling direction of the wireless communication device in some embodiments.

According to some embodiments, the handover statistics may comprise distances in which a handover needs to be performed (the distances associated with respective geographical positions) and the location-related parameters may comprise a geographical position of the wireless communication device and a travelling speed of the wireless communication device. In such embodiments, dynamically determining the transmission pattern may comprise mapping the geographical position of the wireless communication device to a corresponding distance using the handover statistics, calculating a time in which a handover needs to be performed based on the corresponding distance and the speed of the wireless communication device, and determining the transmission pattern based on the time.

In some embodiments, the distances of the handover statistics may be further associated with respective directions from the respective geographical positions and the location-related parameters may further comprise a travelling direction of the wireless communication device. In such embodiments, mapping the geographical position of the wireless communication device to a corresponding distance using the handover statistics may comprise mapping the geographical position and the travelling direction of the wireless communication device to the corresponding distance using the handover statistics.

According to some embodiments, the handover statistics may comprise times in which a handover needs to be performed (the times associated with respective geographical positions) and the location-related parameters may comprise a geographical position of the wireless communication device. In such embodiments, dynamically determining the transmission pattern may comprise mapping the geographical position of the wireless communication device to a corresponding time using the handover statistics, and determining the transmission pattern based on the time.

The mapping may, for example, be implemented via a look-up table addressed using geographical positions and keeping times in which a handover needs to be performed for respective geographical positions.

Dynamically determining the transmission pattern may, according to some embodiments, be further based on an amount of interference experienced by the wireless communication device. The amount of interference may, for example, be measured by the wireless communication device and reported to the network node or may be estimated by the network node.

In some embodiments, the transmission pattern may be determined as at least one of a frequency of transmission and a fraction of time to be used for the transmission of the reference signals. The frequency of transmission is related to how often the reference signals are to be transmitted according to the transmission pattern.

Alternatively or additionally, the transmission pattern may be thought of as one or more of a transmission density, a transmission rate, and a transmission duty cycle according to various embodiments.

The transmission pattern may belong to a finite number of transmission patterns. Keeping the finite number small has the advantages of avoiding frequency changes in the transmission pattern and enabling efficient indication of the transmission pattern to the wireless communication device.

The determined transmission pattern may be indicated to the wireless communication device in relation to initiation of the transmission of the reference signals according to some embodiments.

Alternatively or additionally, the determined transmission pattern may be indicated to the wireless communication device when the determined transmission pattern is changed according to some embodiments.

In some embodiments, the method may further comprise determining a reporting interval based on the determined transmission pattern (wherein the reporting interval is for reports of the mobility measurements by the wireless communication device) and indicating the reporting interval to the wireless communication device.

According to some embodiments, network nodes of the cellular communication network are each adapted to support a plurality of beams of a signal beam-forming scheme and to communicate with the wireless communication device using one of the plurality of beams, and the mobility measurements relate to at least one of a decision regarding handover between beams supported by different network nodes and a decision regarding handover between beams supported by a single network node.

Acquiring the location-related parameters of the wireless communication device may, according to some embodiments, comprise one or more of receiving the location-related parameters from the wireless communication device, performing measurements related to the wireless communication device for estimation of the location-related parameters, receiving information related to the wireless communication device for estimation of the location-related parameters, and estimating the location-related parameters based on at least one of performed measurements related to the wireless communication device and received information related to the wireless communication device.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

According to a third aspect, an arrangement is provided for a network node of a cellular communication network, wherein the network node is adapted to communicate with a wireless communication device.

The arrangement comprises a controller adapted to cause acquisition of location-related parameters of the wireless communication device and dynamic determination (based on the acquired location-related parameters) of a transmission pattern of reference signals, wherein the reference signals are for mobility measurements by the wireless communication device.

The controller is also adapted to cause indication of the determined transmission pattern to the wireless communication device, and transmission of the reference signals in accordance with the determined transmission pattern.

The acquisition may, for example, be performed by a receiver. The determination may, for example, be performed by a determiner. The determiner may be comprised in the controller or may be external to the controller. The indication and/or the transmission may, for example, be performed by a transmitter.

The controller may, according to some embodiments, be adapted to cause the dynamic determination of the transmission pattern based also on handover statistics associated with the location-related parameters.

The handover statistics may, for example, be comprised in a data base that may be comprised in the controller or may be external to the controller).

In some embodiments, the handover statistics may comprise distances in which a handover needs to be performed (the distances associated with respective geographical positions) and the location-related parameters may comprise a geographical position of the wireless communication device and a travelling speed of the wireless communication device. In such embodiments, the controller may be adapted to cause the dynamic determination of the transmission pattern by causing mapping of the geographical position of the wireless communication device to a corresponding distance using the handover statistics, calculation of a time in which a handover needs to be performed based on the corresponding distance and the speed of the wireless communication device, and determination of the transmission pattern based on the time.

The mapping may, for example, be performed by a mapper. The mapper may be comprised in the controller or may be external to the controller. The calculation may, for example, be performed by a calculator. The calculator may be comprised in the controller or may be external to the controller. The determination may, for example, be performed by a determiner. The determiner may be comprised in the controller or may be external to the controller.

According to some embodiments, the controller may be adapted to cause acquisition of the location-related parameters of the wireless communication device by causing one or more of reception of the location-related parameters from the wireless communication device, performance of measurements related to the wireless communication device for estimation of the location-related parameters, reception of information related to the wireless communication device for estimation of the location-related parameters, and estimation of the location-related parameters based on at least one of performed measurements related to the wireless communication device and received information related to the wireless communication device.

The reception(s) may, for example, be performed by a receiver. Some or all of the various measurements may, for example, be performed by a measuring unit. The measuring unit may be comprised in the controller or may be external to the controller. The estimation may, for example, be performed by an estimator. The estimator may be comprised in the controller or may be external to the controller.

A fourth aspect is a network node of a cellular communication network, the network node comprising the arrangement according to the third aspect.

In some embodiments, the third and fourth aspects may additionally have features identical with or corresponding to any of the various features as explained above for the first aspect.

An advantage of some embodiments is that a flexible approach to determination of reference signal transmission patterns for mobility measurements is provided.

Another advantage of some embodiments is that good handover performance (e.g. robustness) is accomplished while providing for efficient usage of radio resources.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a transmission pattern of reference signals for mobility measurements is dynamically determined in a network node based on location-related parameters of a wireless communication device served by the network node.

Embodiments described herein are particularly applicable when network nodes are adapted to support a plurality of beams of a signal beam-forming scheme, and the mobility measurements relate to beam handover and/or node handover. However, this is not to be construed as limiting. Contrarily, some embodiments may be equally applicable to non-beam-forming systems where the mobility measurements only relate to node handover and any intermediate application.

Figure 1:
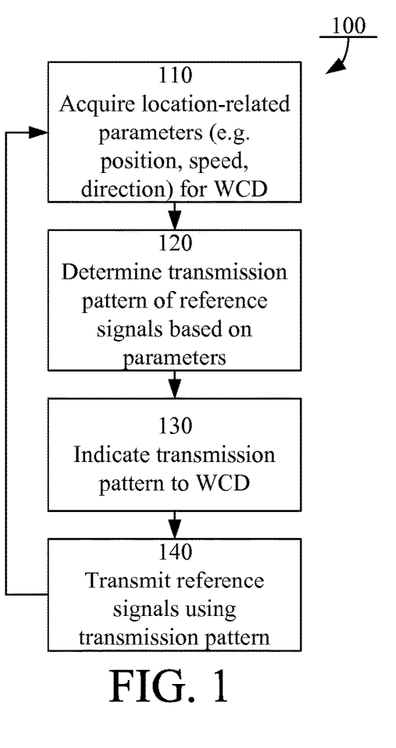
FIG. 1 is a flowchart illustrating example method steps according to some embodiments.

FIG. 1 illustrates an example method 100 according to some embodiments. The example method 100 may, for example, be performed in a network node of a cellular communication network, wherein the network node is adapted to communicate with a wireless communication device. Alternatively, the various steps of the example method 100 may be performed in different network nodes of the cellular communication network (distributed performance of the method), wherein at least one network node of the cellular communication network is adapted to communicate with a wireless communication device.

The method starts in step 110 where location-related parameters of the wireless communication device are acquired. Acquiring the location-related parameters of the wireless communication device may be accomplished using any suitable approach or combination of approaches. For example, the location-related parameters (or indications thereof) may be received from the wireless communication device. Alternatively or additionally, information for estimation of the location-related parameters may be received (e.g. from another network node) and/or measurements may be performed for estimation of the location-related parameters at the network node.

As elaborated on above, the location-related parameters may, for example, comprise one or more of a geographical position of the wireless communication device, a travelling speed of the wireless communication device, and a travelling direction of the wireless communication device. The travelling direction could be estimated from current and previous geographical positions.

A transmission pattern of reference signals for mobility measurements by the wireless communication device is determined in step 120 based on the acquired location-related parameters.

As elaborated on above, the transmission pattern may be determined as a frequency of transmission (i.e. how often the reference signals are to be transmitted according to the transmission pattern) and/or as a fraction of the total transmission time to be used for the transmission of the reference signals.

For example, the transmission pattern may be determined as a function of the travelling speed such that a frequency of transmission is proportional to (or is an increasing function of) the travelling speed (possibly with a bias term).

The determination of the transmission pattern in step 120 may be further based on handover statistics associated with the location-related parameters. The handover statistics may be realized in the form of a look-up table.

The handover statistics may, for example, comprise statistics of distances and/or times in which a handover needs to be performed. The formulation that a handover needs to be performed in a certain distance and/or time includes, but is not limited to, the case where the handover needs to be performed to avoid loss of connection and the case where the handover needs to be performed to fulfill a performance criterion.

Alternatively or additionally, the handover statistics may comprise a serving beam loss rate. Then, the transmission pattern may be determined directly from the serving beam loss rate (e.g. as a function specifying transmission frequency or via another look-up table).

Furthermore, the handover statistics may be dynamically updated in any suitable way as handovers are completed and/or connection is lost.

For example, a look-up table could comprise entries for the times or distances in which a handover needs to be performed, wherein the entries are addressed by one of the geographical position, the travelling speed and the travelling direction (or any combination thereof) of the wireless communication device.

In an example where only the geographical position is used, times in which a handover needs to be performed may be used for the handover statistics.

In an example where only the geographical position is used, times in which a handover needs to be performed or serving beam loss rate may be used for the handover statistics. In an example where only the travelling speed is used, a direct mapping between speed and transmission pattern may be applied.

The handover statistics may be initially estimated in a start-up phase where reference signals are always transmitted (or more frequently transmitted than in a later phase). The start-up phase could end when sufficient statistics have been gathered.

For example, if the handover statistics comprises distances in which a handover needs to be performed, reference signals measurements may, in the start-up phase, log the time it takes for a serving beam to decay from X dB weaker in terms of power than a candidate to Y dB weaker than the candidate beam, where X and Y could, for example, be set 1 and 10. The distance may then be estimated by dividing the estimated travelling speed with the logged time. The distance estimate may be improved by suitable filtering.

After the start-up phase the distance may be dynamically adjusted with a control algorithm based on how often the serving beam is lost (based on lack of reference signal transmissions from the network node). An example control algorithm may comprise decreasing the distance for a geographical position with a first factor (e.g. 4) when the serving beam is lost and increasing is with a second factor (e.g. 2) if no serving beam has been lost during a time window (e.g. a week).

Figure 2:
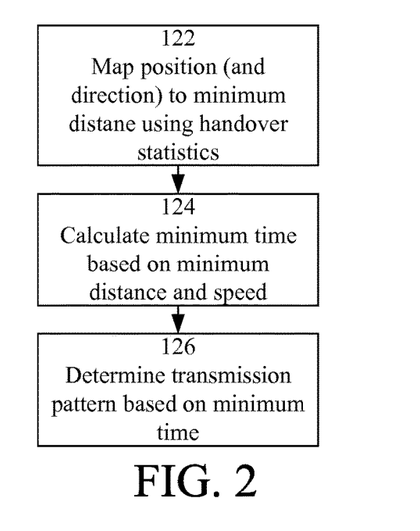
FIG. 2 is a flowchart illustrating example method steps according to some embodiments.

FIG. 2 illustrates example method steps that may be performed as part of step 120 of FIG. 1 according to some embodiments. In this example, the handover statistics comprise distances in which a handover needs to be performed, wherein the distances are associated with respective geographical positions of the wireless communication device.

In step 122, the geographical position (possibly supplemented by a travelling direction of the wireless communication device) is mapped to a distance in which a handover needs to be performed using the handover statistics.

In step 124, a time (or a duration of time or a time window) in which a handover needs to be performed is calculated based on the distance of step 122 and the travelling speed of the wireless communication device. For example, the distance may be divided by the travelling speed to achieve the time.

In step 126, the transmission pattern is determined based on the time of step 124. For example, a further look-up table may comprise a mapping from time to transmission pattern. Alternatively or additionally, the transmission pattern may be determined such that a frequency of transmission is a decreasing function of the time.

In a particular example applicable to FIG. 2, the network node has acquired estimates of the geographical position and travelling speed of the wireless communication device.

From previous measurements (i.e. handover statistics) a distance in which a handover needs to take place has been estimated and stored, e.g. by the network node, in a look-up table indexed by the geographical position of the wireless communication device (compare with step 122). By diving the distance corresponding to the acquired geographical position by the acquired travelling speed the time in which a handover needs to take place can be estimated (compare with step 124).

A transmission frequency (i.e. a form of transmission pattern) may then be determined by taking the largest time period (e.g. from a set of allowable time periods of predetermined transmission patterns) that is less than the difference between a scaled version of the time and a processing term (compare with step 126). The scaling factor applied to the time should typically be less than or equal to 1 (e.g. 0.5) and the processing term should typically be larger than or equal to the time it takes to perform a handover after a sufficient amount of reference signals have been transmitted. If no allowable time period fulfills the criterion, the smallest allowable time period can be used.

This example may be extended to cases where several, say n, reference signal transmissions are required to complete the mobility measurements. Then, the time period of the transmission pattern need to be approximately n times smaller.

Generally, the determination of the transmission pattern may also be based on the amount of interference (e.g. number of interfering beams). This may be beneficial since a weak beam may be used longer if there is no interference than if there is interference. This could be implemented, for example, by adjusting the distance based on how many and which beams are active.

Returning now to FIG. 1, and after having performed step 120, the determined transmission pattern is indicated (e.g. by the network node) to the wireless communication device in step 130 (e.g. by transmitting an indication of the transmission pattern). For example, if the transmission pattern belongs to a finite number of predetermined transmission patterns, step 130 may comprise transmitting an index of the applicable transmission pattern to the wireless communication device.

The determined transmission pattern may be indicated to the wireless communication device in relation to initiation of the transmission of the reference signals and/or when the determined transmission pattern is changed.

In step 140, reference signals are transmitted in accordance with the determined transmission pattern, and a handover decision may be formed based on measurements of the reference signals according to any suitable approach.

That the transmission pattern is determined dynamically is illustrated by a loop-back from step 140 to step 110. The dynamicity of the determination of the transmission pattern may take any suitable form. For example, the transmission pattern could be determined at regular time intervals (e.g. with a periodicity of 0.1-10 seconds) and/or based on some triggering event. Other parameters that may be relevant for how often the transmission pattern should be determined may comprise a precision of the geographical position parameter and a beam coverage area.

Dynamically varying the transmission pattern may be complemented by a dynamic variation of a reporting interval for reports of the mobility measurements by the wireless communication device. For example, if a transmission frequency of the reference signals is low, it may be enough to receive measurement reports relatively seldom and vice versa.

Figure 3:
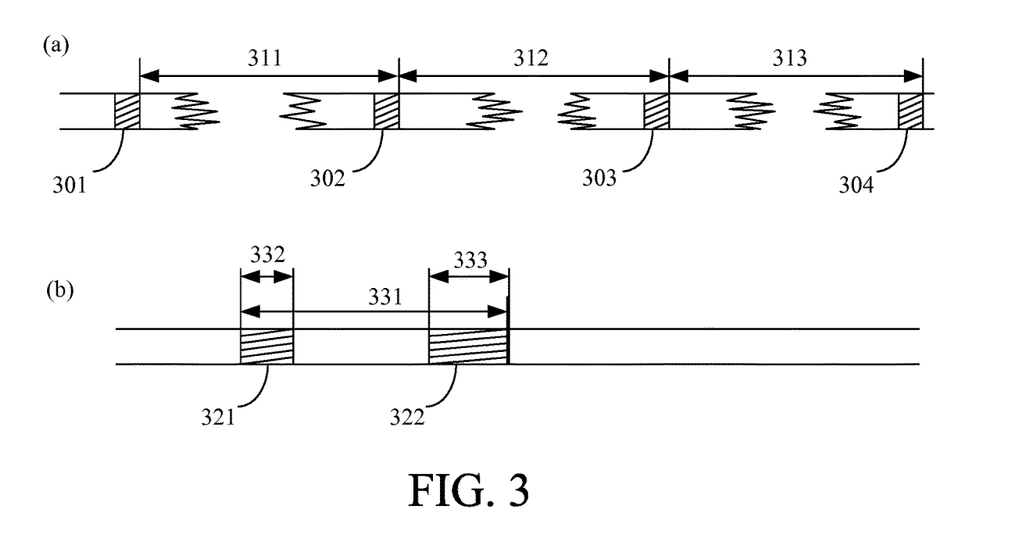
FIG. 3 is a schematic drawing illustrating example transmission patterns achieved when applying some embodiments.

FIG. 3 is a schematic drawing illustrating example transmission patterns. Time runs from left to right in FIG. 3. Part (a) illustrates that the transmission pattern may define a transmission frequency of reference signals and part (b) illustrates that the transmission pattern may define a fraction of time used for transmission of reference signals.

In part (a) reference signals 301, 302, 303, 304 are transmitted in equally long time slots (e.g. subframes) and the transmission pattern defines how far apart in time 311, 312, 313 these time slots appear.

In part (b) reference signals 321, 322 may be transmitted during a period of time 331 and the transmission pattern defines the portion of the period of time used to transmit the reference signals (i.e. the portion being equal to the total length of periods 332 and 333 divided by the length of period 331).

Numerous variations of the concepts described in connection to FIG. 3 are, of course, possible.

Figure 4:
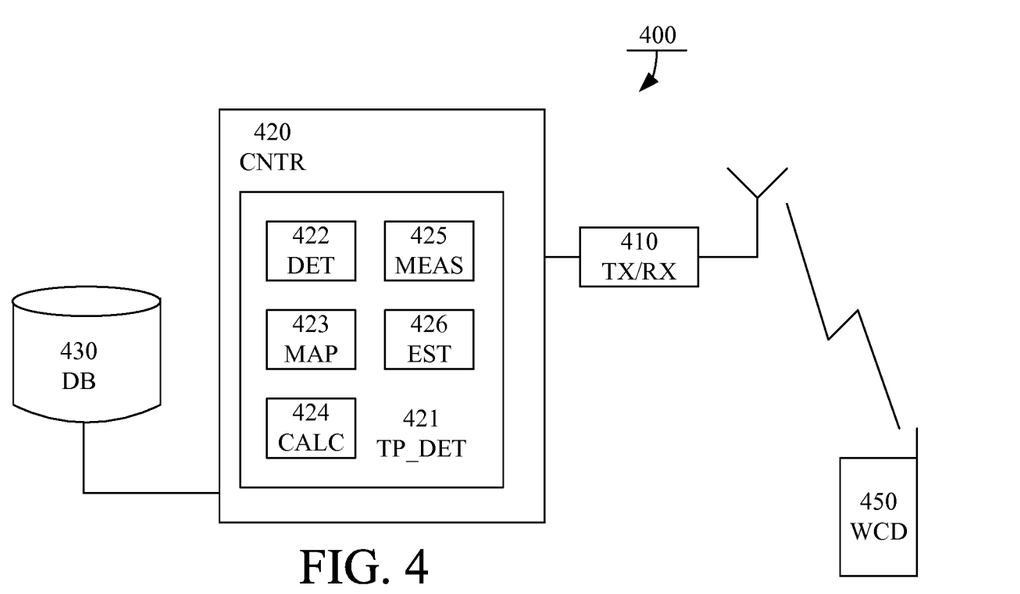
FIG. 4 is a block diagram illustrating an example system including an example network node arrangement according to some embodiments.

FIG. 4 schematically illustrates an example arrangement 400 according to some embodiments. The example arrangement 400 may, for example, be adapted to perform or cause performance of the method described in connection to FIG. 1.

The example arrangement 400 may be comprised in a network node adapted to communicate with a wireless communication device (WCD) 450.

The example arrangement comprises a controller (CNTR) 420 and may further comprise a transmitter and a receiver (illustrated as a transceiver (TX/RX) 410) and/or a database (DB) 430.

The controller 420 is adapted to cause acquisition of location-related parameters of the wireless communication device (compare with step 110 of FIG. 1). The acquisition may, for example, be performed by the transceiver 410.

The controller 420 is also adapted to cause dynamic determination of a transmission pattern of reference signals (compare with step 120 of FIG. 1). The determination may, for example, be performed by a transmission pattern determiner (TP_DET) 421 (illustrated in FIG. 4 as comprised in the controller 420).

The dynamic determination of the transmission pattern is based on the location-related parameters, and may be further based on handover statistics associated with the location-related parameters and kept in the data base 430.

Various examples of how the transmission pattern may be dynamically determined have been described above and will not be repeated lengthily here.

It is noted, however that the transmission pattern determiner 421 may comprise various modules adapted to perform respective tasks. Such modules are exemplified in FIG. 4 by a determiner (DET) 422, a mapper (MAP) 423, a calculator (CALC) 424, a measurement unit (MEAS) 425 and an estimator (EST) 426, but it should be noted that modules may be added to and/or deleted from the example collection of modules in FIG. 4.

The determiner 422 may be adapted to determine the transmission pattern from a relevant parameter (e.g. a distance or a time) as elaborated on above.

The mapper 423 may be adapted to perform a mapping of one or more of the location-related parameters to another parameter (e.g. a distance or a time as elaborated on above) based on the handover statistics as elaborated on above.

The calculator 424 may be adapted to calculate a time from a distance and a speed as elaborated on above.

The measurement unit 425 and/or the estimator 426 may be used to acquire the location-related parameters as elaborated on above.

The controller 420 is also adapted to cause indication of the determined transmission pattern to the wireless communication device (compare with step 130 of FIG. 1) and transmission of the reference signals in accordance with the determined transmission pattern (compare with step 140 of FIG. 1). The indication and/or the transmission may, for example, be performed by the transceiver 410.

The example arrangement 400 may be partly or fully comprised in a network node of a cellular communication network. In some embodiments, various parts of the example arrangement 400 may be comprised in different network nodes of the cellular communication network. For example, the controller 420 and the transceiver 410 may be comprised in a radio access network node while the data base 430 may be comprised in a cartelized server of the cellular communication network.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a network node) comprising circuitry/logic or performing methods according to any of the embodiments.

Figure 5:
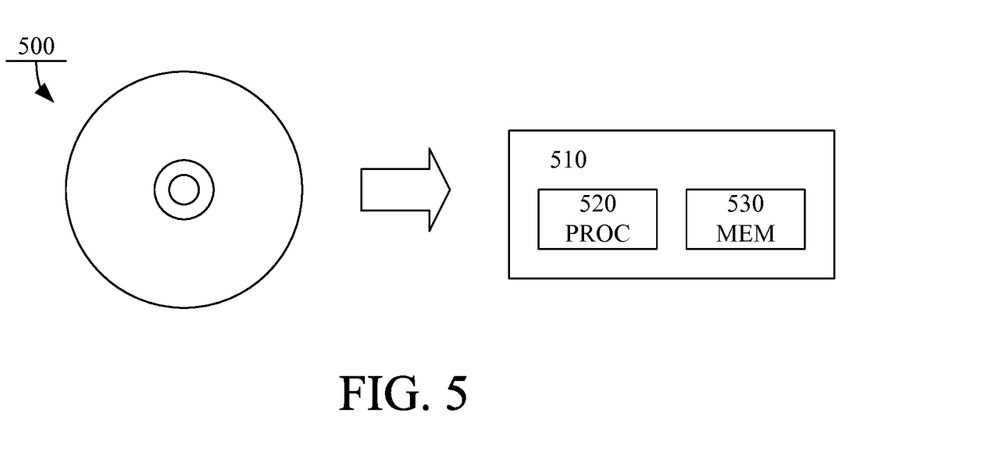
FIG. 5 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 500 illustrated in FIG. 5. The computer readable medium may have stored thereon a computer program comprising program instructions. The computer program may be loadable into a data-processing unit (PROC) 520, which may, for example, be comprised in a network node 510. When loaded into the data-processing unit, the computer program may be stored in a memory (MEM) 530 associated with or integral to the data-processing unit. According to some embodiments, the computer program may, when loaded into and run by the data-processing unit, cause the data-processing unit to execute method steps according to, for example, the methods shown in and described in connection with any of the FIGS. 1-2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for a network node of a cellular communication network, wherein the network node is adapted to communicate with a wireless communication device, the method comprising:
 acquiring location-related parameters of the wireless communication device;
 dynamically determining, based on the acquired location-related parameters, a transmission time-period pattern of reference signals, wherein the reference signals are configured to enable handover-related mobility measurements by the wireless communication device, and wherein dynamically determining the transmission time-period pattern comprises selecting one of a plurality of transmission time-period patterns based on a predicted timing of a handover indicated by the acquired location-related parameters;
 indicating the determined transmission time-period pattern to the wireless communication device; and
 transmitting the reference signals in accordance with the determined transmission time-period pattern.

2. The method of claim 1, wherein dynamically determining the transmission pattern is further based on handover statistics associated with the location-related parameters.

3. The method of claim 1, wherein the location-related parameters comprise at least one of a geographical position of the wireless communication device and a travelling speed of the wireless communication device.

4. The method of claim 3, wherein the location-related parameters further comprise a travelling direction of the wireless communication device.

5. The method of claim 2, wherein the handover statistics comprise distances in which a handover needs to be performed, the distances associated with respective geographical positions,
 wherein the location-related parameters comprise a geographical position of the wireless communication device and a travelling speed of the wireless communication device, and
 wherein dynamically determining the transmission pattern comprises:
 mapping the geographical position of the wireless communication device to a corresponding distance using the handover statistics;
 calculating a time in which a handover needs to be performed based on the corresponding distance and the speed of the wireless communication device; and
 determining the transmission pattern based on the time.

6. The method of claim 5, wherein the distances of the handover statistics are further associated with respective directions from the respective geographical positions,
 wherein the location-related parameters further comprise a travelling direction of the wireless communication device, and
 wherein mapping the geographical position of the wireless communication device to a corresponding distance using the handover statistics comprises mapping the geographical position and the travelling direction of the wireless communication device to the corresponding distance using the handover statistics.

7. The method of claim 2, wherein the handover statistics comprise times in which a handover needs to be performed, the times associated with respective geographical positions,
   wherein the location-related parameters comprise a geographical position of the wireless communication device, and
   wherein dynamically determining the transmission pattern comprises:
   mapping the geographical position of the wireless communication device to a corresponding time using the handover statistics; and
   determining the transmission pattern based on the time.

8. The method of claim 1, wherein dynamically determining the transmission pattern is further based on an amount of interference experienced by the wireless communication device.

9. The method of claim 1, wherein the transmission pattern is determined as at least one of:
   a frequency of transmission; and
   a fraction of time to be used for the transmission.

10. The method of claim 1, wherein indicating the determined transmission pattern to the wireless communication device comprises indicating the determined transmission pattern to the wireless communication device in relation to initiation of the transmission of the reference signals.

11. The method of claim 1, wherein indicating the determined transmission pattern to the wireless communication device comprises indicating the determined transmission pattern to the wireless communication device when the determined transmission pattern is changed.

12. The method of claim 1, further comprising:
    determining a reporting interval based on the determined transmission pattern, wherein the reporting interval is for reports of the mobility measurements by the wireless communication device; and
    indicating the reporting interval to the wireless communication device.

13. The method of claim 1, wherein network nodes of the cellular communication network are each adapted to support a plurality of beams of a signal beam-forming scheme and to communicate with the wireless communication device using one of the plurality of beams, and wherein the mobility measurements relate to at least one of a decision regarding handover between beams supported by different network nodes and a decision regarding handover between beams supported by a single network node.

14. The method of claim 1, wherein acquiring the location-related parameters of the wireless communication device comprises one or more of:
    receiving the location-related parameters from the wireless communication device;
    performing measurements related to the wireless communication device for estimation of the location-related parameters;
    receiving information related to the wireless communication device for estimation of the location-related parameters; and
    estimating the location-related parameters based on at least one of performed measurements related to the wireless communication device and received information related to the wireless communication device.

15. A nontransitory computer readable medium, having thereon a computer program comprising program instructions, the computer program being loadable into a data-processing unit and adapted to cause execution of a method when the computer program is run by the data-processing unit, wherein the method is for a network node of a cellular communication network, wherein the network node is adapted to communicate with a wireless communication device, wherein the method comprises:
    acquiring location-related parameters of the wireless communication device;
    dynamically determining, based on the acquired location-related parameters, a transmission time-period pattern of reference signals, wherein the reference signals are configured to enable handover-related mobility measurements by the wireless communication device, and wherein dynamically determining the transmission time-period pattern comprises selecting one of a plurality of transmission time-period patterns based on a predicted timing of a handover indicated by the acquired location-related parameters;
    indicating the determined transmission time-period pattern to the wireless communication device; and
    transmitting the reference signals in accordance with the determined transmission time-period pattern.

16. An arrangement for a network node of a cellular communication network, wherein the network node is adapted to communicate with a wireless communication device, the arrangement comprising a controller adapted to cause:
    acquisition of location-related parameters of the wireless communication device;
    dynamic determination, based on the acquired location-related parameters, of a transmission time-period pattern of reference signals, wherein the reference signals are configured to enable handover-related mobility measurements by the wireless communication device, and wherein dynamically determining the transmission time-period pattern comprises selecting one of a plurality of transmission time-period patterns based on a predicted timing of a handover indicated by the acquired location-related parameters;
    indication of the determined transmission time-period pattern to the wireless communication device; and
    transmission of the reference signals in accordance with the determined transmission time-period pattern.

17. The arrangement of claim 16, wherein the controller is adapted to cause the dynamic determination of the transmission pattern based also on handover statistics associated with the location-related parameters.

18. The arrangement of claim 16, wherein the location-related parameters comprise at least one of a geographical position of the wireless communication device and a travelling speed of the wireless communication device.

19. The arrangement of claim 18, wherein the location-related parameters further comprise a travelling direction of the wireless communication device.

20. The arrangement of claim 17, wherein the handover statistics comprise distances in which a handover needs to be performed, the distances associated with respective geographical positions,
    wherein the location-related parameters comprise a geographical position of the wireless communication device and a travelling speed of the wireless communication device, and
    wherein the controller is adapted to cause the dynamic determination of the transmission pattern by causing:

mapping of the geographical position of the wireless communication device to a corresponding distance using the handover statistics;
calculation of a time in which a handover needs to be performed based on the corresponding distance and the speed of the wireless communication device; and
determination of the transmission pattern based on the time.

21. The arrangement of claim 20, wherein the distances of the handover statistics are further associated with respective directions from the respective geographical positions,
wherein the location-related parameters further comprise a travelling direction of the wireless communication device, and
wherein the controller is adapted to cause the mapping of the geographical position of the wireless communication device to a corresponding distance using the handover statistics by causing mapping of the geographical position and the travelling direction of the wireless communication device to the corresponding distance using the handover statistics.

22. The arrangement of claim 17, wherein the handover statistics comprise times in which a handover needs to be performed, the times associated with respective geographical positions,
wherein the location-related parameters comprise a geographical position of the wireless communication device, and
wherein the controller is adapted to cause the dynamic determination of the transmission pattern by causing:
mapping of the geographical position of the wireless communication device to a corresponding time using the handover statistics; and
determination of the transmission pattern based on the time.

23. The arrangement of claim 16, wherein the controller is adapted to cause the dynamic determination of the transmission pattern based also on an amount of interference experienced by the wireless communication device.

24. The arrangement of claim 16, wherein the controller is adapted to cause the transmission pattern to be determined as at least one of:
a frequency of transmission; and
a fraction of time to be used for the transmission.

25. The arrangement of claim 16, wherein the controller is adapted to cause the determined transmission pattern to be indicated to the wireless communication device in relation to initiation of the transmission of the reference signals.

26. The arrangement of claim 16, wherein the controller is adapted to cause the determined transmission pattern to be indicated to the wireless communication device when the determined transmission pattern is changed.

27. The arrangement of claim 16, wherein the controller is further adapted to cause:
determination of a reporting interval based on the determined transmission pattern, wherein the reporting interval is for reports of the mobility measurements by the wireless communication device; and
indication of the reporting interval to the wireless communication device.

28. The arrangement of claim 16, wherein network nodes of the cellular communication network are each adapted to support a plurality of beams of a signal beam-forming scheme and to communicate with the wireless communication device using one of the plurality of beams, and wherein the mobility measurements relate to at least one of a decision regarding handover between beams supported by different network nodes and a decision regarding handover between beams supported by a single network node.

29. The arrangement of claim 16, wherein the controller is adapted to cause acquisition of the location-related parameters of the wireless communication device by causing one or more of:
reception of the location-related parameters from the wireless communication device;
performance of measurements related to the wireless communication device for estimation of the location-related parameters;
reception of information related to the wireless communication device for estimation of the location-related parameters; and
estimation of the location-related parameters based on at least one of performed measurements related to the wireless communication device and received information related to the wireless communication device.

30. A network node of a cellular communication network, the network node comprising the arrangement according to claim 16.

* * * * *